(12) United States Patent
Li

(10) Patent No.: US 10,314,075 B2
(45) Date of Patent: Jun. 4, 2019

(54) MULTI-TRANSCEIVER CONFIGURATION METHOD, MULTI-TRANSCEIVER CHANNEL MULTIPLEXING METHOD, AND APPARATUS

(71) Applicant: Huawei Technologies Co., Ltd., Shenzhen (CN)

(72) Inventor: Dejian Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 106 days.

(21) Appl. No.: 15/613,506

(22) Filed: Jun. 5, 2017

(65) Prior Publication Data
US 2017/0272696 A1 Sep. 21, 2017

Related U.S. Application Data

(63) Continuation of application No. PCT/CN2014/093177, filed on Dec. 5, 2014.

(51) Int. Cl.
*H04W 72/04* (2009.01)
*H04W 72/12* (2009.01)
(Continued)

(52) U.S. Cl.
CPC ............ *H04W 74/04* (2013.01); *H04L 5/0058* (2013.01); *H04L 5/0078* (2013.01);
(Continued)

(58) Field of Classification Search
CPC ........ H04W 72/0446; H04W 72/1226; H04W 72/121; H04W 72/1263; H04W 72/042;
(Continued)

(56) References Cited

U.S. PATENT DOCUMENTS 5,657,323 A 8/1997 Jan et al.
2005/0180350 A1 8/2005 Kolor et al.
(Continued)

FOREIGN PATENT DOCUMENTS

CN 1938976 A 3/2007
CN 101389062 A 3/2009
(Continued)

OTHER PUBLICATIONS

Khorov, E. et al., "A survey on IEEE 802.11ah: An enabling networking technology for smart cities," Computer Communications 58 (2015), pp. 53-69.vol. 58, Sep. 3, 2014,18 pages.
Aiello, R., et al., "Channelization Considerations for Smart Grid," doc. IEEE 802.11-12/108R0, Jan. 16, 2012, 10 pages.

*Primary Examiner* — Joshua Kading
(74) *Attorney, Agent, or Firm* — Slater Matsil, LLP

(57) ABSTRACT

A multi-transceiver configuration method, a multi-transceiver channel multiplexing method, and an apparatus are disclosed. The multi-transceiver configuration method includes: an access point obtains maximum data transfer rates $R_i(n)$ of N terminals $STA_i$s on sub-channels n in a specified sub-channel combination, where $1 \leq i \leq N$, and N is a positive integer greater than 1; and calculates a channel access time $T_i(n)$ required by the $STA_i$ for transmitting an average data volume on the sub-channel n, and when the specified sub-channel combination manner meets an allocation requirement of the N $STA_i$s, the access point configures at least one transceiver for each sub-channel n in the specified sub-channel combination.

18 Claims, 5 Drawing Sheets

(51) Int. Cl.
- *H04W 72/00* (2009.01)
- *H04L 5/00* (2006.01)
- *H04W 74/04* (2009.01)
- *H04W 74/00* (2009.01)
- *H04W 28/16* (2009.01)
- *H04W 28/02* (2009.01)
- *H04W 84/12* (2009.01)

(52) U.S. Cl.
CPC ....... *H04W 28/0236* (2013.01); *H04W 28/16* (2013.01); *H04W 72/00* (2013.01); *H04W 72/042* (2013.01); *H04W 72/0426* (2013.01); *H04W 72/0446* (2013.01); *H04W 72/0453* (2013.01); *H04W 72/121* (2013.01); *H04W 72/1226* (2013.01); *H04W 72/1263* (2013.01); *H04W 74/006* (2013.01); *H04L 5/0007* (2013.01); *H04W 84/12* (2013.01)

(58) Field of Classification Search
CPC ......... H04W 72/0453; H04W 72/0426; H04W 72/00; H04W 28/0236; H04W 28/16–28/26; H04W 74/04; H04W 74/006; H04W 84/12; H04L 5/0058; H04L 5/0078; H04L 5/0007; H04L 5/006; H04L 5/0064; H04L 5/0087
See application file for complete search history.

(56) References Cited

U.S. PATENT DOCUMENTS

| | | | |
|---|---|---|---|
| 2005/0270975 A1* | 12/2005 | Meylan | H04L 47/14 370/229 |
| 2011/0051599 A1 | 3/2011 | Tanigawa et al. | |
| 2011/0222486 A1 | 9/2011 | Hart | |
| 2011/0310834 A1 | 12/2011 | Seok | |
| 2013/0223422 A1 | 8/2013 | Abraham et al. | |
| 2014/0098748 A1 | 4/2014 | Chan et al. | |
| 2015/0250003 A1 | 9/2015 | Seok et al. | |

FOREIGN PATENT DOCUMENTS

| | | |
|---|---|---|
| CN | 103517445 A | 1/2014 |
| CN | 103828265 A | 5/2014 |

* cited by examiner

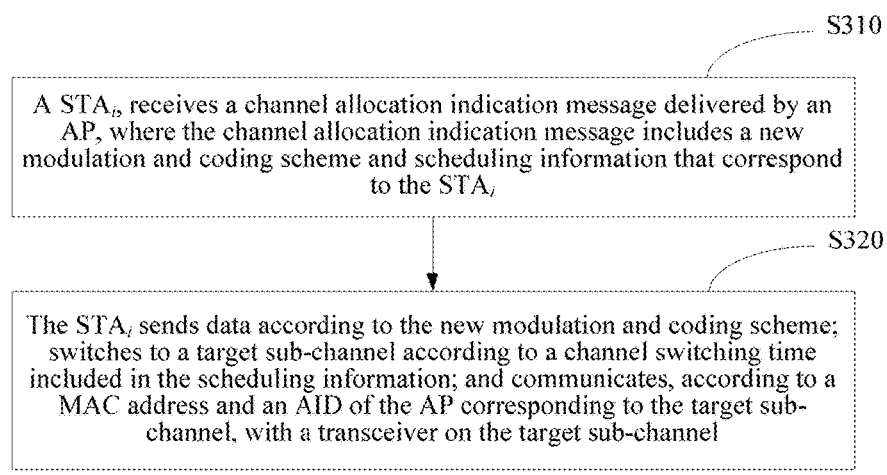

MULTI-TRANSCEIVER CONFIGURATION METHOD, MULTI-TRANSCEIVER CHANNEL MULTIPLEXING METHOD, AND APPARATUS

CROSS-REFERENCE TO RELATED APPLICATIONS

This application is a continuation of International Application No. PCT/CN2014/093177, filed on Dec. 5, 2014, the disclosure of which is hereby incorporated by reference in its entirety.

TECHNICAL FIELD

The present invention relates to the field of communications technologies, and in particular, to a multi-transceiver configuration method, a multi-transceiver channel multiplexing method, and an apparatus.

BACKGROUND

With development of the Internet of Things, a wireless local area network designed for the Internet of Things has a good development prospect. A wireless video surveillance network is a specific application scenario of a wireless local area network designed for the Internet of Things.

In the standard IEEE 802.11ah of a wireless local area network designed for the Internet of Things, a frequency band from 779 MHz to 787 MHz of China is divided into eight 1-MHz channels, four 2-MHz channels, two 4-MHz channels, and one 8-MHz channel. According to a channel division method of 802.11ah, in China, a maximum channel bandwidth of a frequency band (the frequency band from 779 MHz to 787 MHz) of the Internet of Things lower than 1 GHz used for various control or sensor devices is only 8 MHz. In addition, in the wireless video surveillance network, a data rate of a high-definition video stream is relatively high. For example, in a high-definition video surveillance network, a data rate of a single terminal is 0.5 Mbps to 2.5 Mbps. Assuming that a quantity of terminals (Stations, STAs) in the wireless video surveillance network is 12, an aggregation throughput of the wireless video surveillance network may reach 30 Mbps. In addition, high-definition video stream compression coding is classified into two coding manners: fixed bit rate compression and variable bit rate compression. For the variable bit rate compression coding, a data rate is closely related to a change speed of monitored content, so that a video data rate presents an obvious dynamic change characteristic, thereby affecting network indicator parameters such as a throughput and a delay of the wireless video surveillance network.

An AP (Access Point) of a video convergence center in the wireless video surveillance network is responsible for receiving video stream data uploaded by each STA in the network. Because a wavelength value corresponding to the frequency band from 779 MHz to 787 MHz is relatively large, a multi-antenna technology is generally not used in a device of the wireless video surveillance network due to a limitation on device outline dimensions. When the AP performs, by using a single transceiver, networking on an 8-MHz channel according to the IEEE 802.11ah standard, due to a limited bandwidth, concurrently transmitting multiple high-definition video streams easily causes load of the network to reach a saturated state. When the load of the wireless video surveillance network approaches saturation, if a few STAs have to use a low-rate modulation and coding scheme due to deteriorated channel quality, a relatively long distance, and the like, an actual throughput of the wireless video surveillance network is less than service load, an average delay of the entire network is increased, and QoS (Quality of Service) requirements such as delays of all STAs cannot be met. For example, for the bandwidth of the 8-MHz channel, if a few STAs in the wireless video surveillance network can use only a QPSK (Quadrature Phase Shift Keying,) modulation manner, a data rate is only ¼ of a data rate of 64-QAM (Quadrature Amplitude Modulation), and these low-rate STAs significantly decrease an average throughput of the network and increase an average delay.

SUMMARY

Embodiments of the present invention provide a multi-transceiver channel multiplexing method and an apparatus, so as to resolve a prior-art problem of a low throughput and a relatively high delay of a network.

To resolve the foregoing technical problem, the embodiments of the present invention disclose the following technical solutions.

According to a first aspect, embodiments of the present invention provide a transceiver configuration method for an access point, applied to the Internet of Things, where a frequency band of the Internet of Things is divided into multiple sub-channel combinations including any combination of a 1-MHz sub-channel, a 2-MHz sub-channel, a 4-MHz sub-channel, and an 8-MHz sub-channel, and the Internet of Things corresponding to the access point includes N terminals $STA_i$s, where $1 \leq i \leq N$ and N is a positive integer greater than 1. The method includes, for any $STA_i$ in the Internet of Things corresponding to the access point, obtaining, by the access point according to received signal quality information of the $STA_i$, a maximum data transfer rate $R_i(n)$ of the $STA_i$ on each sub-channel n in a specified sub-channel combination; and obtaining, according to an average data volume needing to be sent by the $STA_i$ within a beacon period and $R_i(n)$, a channel access time $T_i(n)$ required by the $STA_i$ on the sub-channel n. The method also includes determining, by the access point according to an available access time $T_{available}(n)$ of each sub-channel n within the beacon period and $T_i(n)$ of the N $STA_i$s, whether the specified sub-channel combination meets an allocation requirement of the N $STA_i$s. The method also includes, when the access point determines that the specified sub-channel combination meets the allocation requirement of the N $STA_i$s, configuring at least one transceiver on each sub-channel n in the specified sub-channel combination, where n=1 indicates an 8-MHz sub-channel; n=2 and n=3 indicate two 4-MHz sub-channels; n=4, n=5, n=6, and n=7 indicate four 2-MHz sub-channels; n=8, n=9, . . . , and n=15 indicate eight 1-MHz sub-channels.

According to a second aspect, a multi-transceiver channel multiplexing method is provided. The method includes sending, by an access point AP by using a transceiver configured on a sub-channel n, a channel allocation indication message to a terminal $STA_i$ allocated to the sub-channel n, where the channel allocation indication message includes a new modulation and coding scheme and scheduling information that correspond to the $STA_i$, so that the $STA_i$ sends data according to the new modulation and coding scheme, and communicates, according to the scheduling information, with the transceiver on the sub-channel on which the $STA_i$ is located. The new modulation and coding scheme and the scheduling information are obtained by the access point by using the transceiver configuration method for an access point according to any one of claims 1 to 6, where n=1 indicates an 8-MHz sub-channel; n=2 and n=3 indicate two 4-MHz sub-channels; n=4, n=5, n=6, and n=7 indicate four 2-MHz sub-channels; n=8, n=9, . . . , and n=15 indicate eight 1-MHz sub-channels.

According to a third aspect, a multi-transceiver channel multiplexing method is provided. The method includes receiving, by a terminal $STA_i$, a channel allocation indication message delivered by an access point AP, where the channel allocation indication message includes a new modulation and coding scheme and scheduling information that correspond to the $STA_i$. The method also includes sending, by the $STA_i$, data according to the new modulation and coding scheme; switching to a target sub-channel according to a channel switching time included in the scheduling information; and communicating, according to a Media Access Control MAC address and an association identifier that are corresponding to the target sub-channel and that are of the access point, with a transceiver configured on the target sub-channel.

According to a fourth aspect, an access point is provided, where a frequency band of the Internet of Things is divided into multiple sub-channel combinations including any combination of a 1-MHz sub-channel, a 2-MHz sub-channel, a 4-MHz sub-channel, and an 8-MHz sub-channel, and the Internet of Things corresponding to the access point includes N terminals $STA_i$s, where 1≤i≤N and N is a positive integer greater than 1. The apparatus includes: a memory and a processor, where the memory stores an executable instruction of the processor, and the processor executes the executable instruction to: for any $STA_i$ in the Internet of Things corresponding to the access point, obtain a maximum data transfer rate $R_i(n)$ of the $STA_i$ on each sub-channel n in a specified sub-channel combination according to received signal quality information of the $STA_i$; and obtain, according to an average data volume needing to be sent by the $STA_i$ within a beacon period and $R_i(n)$, a channel access time $T_i(n)$ required by the $STA_i$ on the sub-channel n; determine, according to an available access time $T_{available}(n)$ of each sub-channel n within the beacon period and $T_i(n)$ of the N $STA_i$s, whether the specified sub-channel combination meets an allocation requirement of the N $STA_i$s; and when it is determined that the specified sub-channel combination meets the allocation requirement of the N $STA_i$s, configure at least one transceiver on each sub-channel n in the specified sub-channel combination, where n=1 indicates an 8-MHz sub-channel; n=2 and n=3 indicate two 4-MHz sub-channels; n=4, n=5, n=6, and n=7 indicate four 2-MHz sub-channels; n=8, n=9, . . . , and n=15 indicate eight 1-MHz sub-channels.

It can be learned from the foregoing technical solutions that, in the multi-transceiver configuration method provided in the embodiments of the present invention, an access point obtains $R_i(n)$ of a $STA_i$ on a sub-channel n in a specified sub-channel combination, and calculates $T_i(n)$ required by the $STA_i$ for transmitting an average data volume on the sub-channel n, and when the specified sub-channel combination manner meets an allocation requirement of N $STA_i$s, the access point configures at least one transceiver for each sub-channel n in the specified sub-channel combination. Configuring multiple parallel transceivers on an access point side to implement parallel transmissions of the $STA_i$s is equivalent to increasing channel access time. In addition, after a channel bandwidth is decreased, a data transfer rate of the STA can be increased generally. Therefore, by means of parallel running of multiple transceivers, a network throughput can be improved.

BRIEF DESCRIPTION OF THE DRAWINGS

The accompanying drawings that constitute a part of the present invention are used to provide a further understanding of the present invention. Example embodiments of the present invention and descriptions of the embodiments are used to describe the present invention, and do not constitute any inappropriate limitation to the present invention. In the accompanying drawings:

FIG. 4 is a schematic diagram of a message format of a channel allocation indication message according to an embodiment of the present invention;

FIG. 5 is a schematic diagram of a message format of an allocation field in the channel allocation indication message shown in FIG. 4;

FIG. 6 is a schematic diagram of a message format of an allocation control field in the allocation field shown in FIG. 5;

FIG. 7 is a flowchart of a multi-transceiver channel multiplexing method according to an embodiment of the present invention;

To describe the technical solutions in the embodiments of the present invention more clearly, the following briefly describes the accompanying drawings required for describing the embodiments. Apparently, a person of ordinary skill in the art may still derive other drawings from these accompanying drawings without creative efforts.

DETAILED DESCRIPTION OF ILLUSTRATIVE EMBODIMENTS

To achieve the objective of the present invention, embodiments of the present invention provide a multi-transceiver channel multiplexing method. First, an 8-MHz frequency band of the Internet of Things is divided into sub-channels whose bandwidths are smaller. An access point having multiple transceivers enables the transceivers to separately run on different sub-channels. Each transceiver correspondingly manages multiple STAs and receives video surveillance data sent by the multiple STAs. That is, the STAs on different sub-channels run in parallel in a frequency division multiplexing manner, and dividing the frequency band into sub-channels is equivalent to adding independent channels to implement parallel transmission, so as to increase a channel access time. In addition, if a channel bandwidth is decreased but transmit power remains unchanged, the STA can correspondingly improve an MCS (Modulation and Coding Scheme) level and a data transfer rate. Therefore, the multi-transceiver channel multiplexing method provided in the embodiments of the present invention can improve a network throughput.

To make a person skilled in the art understand the solutions in the present invention better, the following describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
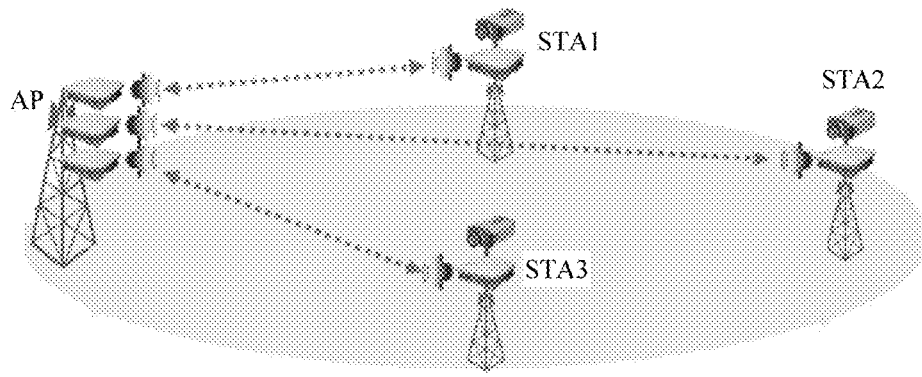
FIG. 1 is a schematic structural diagram of a multi-transceiver wireless video surveillance aggregation network according to an embodiment of the present invention.

Referring to FIG. 1, FIG. 1 is a schematic structural diagram of a multi-transceiver wireless video surveillance aggregation network according to an embodiment of the present invention. As shown in FIG. 1, the wireless video surveillance aggregation network includes an access point AP of a video convergence center. The AP uses a structure of multiple transceivers. The transceivers run on multiple independent sub-channels in a frequency division multiplexing manner. Each transceiver may communicate with multiple STAs on a channel on which the transceiver is located, and each of the transceivers may use a single omnidirectional antenna, a single directional antenna, or multiple antennas. The AP collects video surveillance data of the multiple transceivers and then sends the collected video surveillance data to the video convergence center (a user end of video surveillance).

The following describes a multi-transceiver channel multiplexing method with reference to the video surveillance aggregation network shown in FIG. 1. Before performing an embodiment of the multi-transceiver channel multiplexing method, the AP first divides an 8-MHz channel of a frequency band of the Internet of Things from 779 MHz to 787 MHz into sub-channel combinations, and the sub-channel combinations are stored locally according to an ascending order of a quantity of sub-channels. There are the following two types of combination manners:

One type is the following nine sub-channel combination manners:

(1) two 4-MHz sub-channels, and the AP needs two transceivers;

(2) one 4-MHz sub-channel and two 2-MHz sub-channels, and the AP needs three transceivers;

(3) one 4-MHz sub-channel, one 2-MHz sub-channel, and two 1-MHz sub-channels, and the AP needs four transceivers;

(4) four 2-MHz sub-channels, and the AP needs four transceivers;

(5) one 4-MHz sub-channel and four 1-MHz sub-channels, and the AP needs five transceivers;

(6) three 2-MHz sub-channels and two 1-MHz sub-channels, and the AP needs five transceivers;

(7) two 2-MHz sub-channels and four 1-MHz sub-channels, and the AP needs six transceivers;

(8) one 2-MHz sub-channel and six 1-MHz sub-channels, and the AP needs seven transceivers; and (9) eight 1-MHz sub-channels, and the AP needs eight transceivers.

The nine combination manners from (1) to (9) are arranged according to an ascending order of a quantity of sub-channels, and the AP may determine a specified sub-channel combination manner according to this order. For example, the combination manner (1) is determined as the specified sub-channel combination at the first time; and if the combination manner (1) does not meet a requirement, the combination manner (2) is determined as the specified sub-channel combination at the second time, and the like.

The other type is the following four sub-channel combination manners:

(I) one 8-MHz sub-channel;

(II) two 4-MHz sub-channels;

(III) one 4-MHz sub-channel and two 2-MHz sub-channels; and (IV) four 2-MHz sub-channels.

Similarly, the four combination manners from (I) to (IV) are also arranged according to an ascending order of a quantity of sub-channels, and the AP may determine the specified sub-channel combination manner according to this order.

When a channel resource of the frequency band from 779 MHz to 787 MHz is still insufficient, a frequency band from 470 MHz to 566 MHz and a frequency band from 614 MHz to 779 MHz may be further divided into multiple sub-channels whose bandwidths are 1 MHz. The multiple sub-channels whose bandwidths are 1 MHz and eight 1-MHz sub-channels of the frequency band from 779 MHz to 787 MHz together form a combination of more than eight 1-MHz sub-channels. In this case, the AP needs more than eight transceivers.

The access point determines the specified sub-channel combination in sequence according to the foregoing order of the sub-channel combinations, and calculates whether the specified sub-channel combination meets a delay QoS requirement of each STA in the wireless video surveillance network and a network throughput of the entire network. For example, assuming that one 8-MHz channel does not meet the foregoing requirement, whether two 4-MHz sub-channels meet the foregoing requirement is determined according to the foregoing order of the sub-channel combinations. If quantities of sub-channels in two sub-channel combinations are the same, but bandwidths of the sub-channels in the two sub-channel combinations are not exactly the same, whether the sub-channel combinations whose quantities of sub-channels are the same but bandwidths of the sub-channels are different meet the requirement also needs to be determined according to the foregoing order.

Because a smaller channel bandwidth indicates a greater improvement in an MCS level and a data transfer rate of a STA, an 8-MHz channel is divided into eight 1-MHz sub-channels, and the AP configures eight transceivers, so that an obtained wireless video surveillance network can support a higher network throughput and accommodate more STAs. However, each time the AP adds a transceiver, costs are correspondingly increased. Therefore, a problem of STA allocation on each sub-channel is changed to an optimization problem of using a minimum quantity of transceivers under the premise of ensuring a network throughput. In a specific optimization process, the following two conditions need to be met at the same time:

(1) A maximum data transfer rate $R_i(n)$ of each $STA_i$ on a newly allocated sub-channel n is not less than an average data transfer rate $R_{i,QoS}$, where $R_{i,QoS}$ is an average data rate after video source coding of a $STA_i$ is performed, and n=1, 2, . . . , 15, where n=1 indicates an 8-MHz sub-channel; n=2 and n=3 indicate two 4-MHz sub-channels; n=4, n=5, n=6, and n=7 indicate four 2-MHz sub-channels; n=8, n=9, . . . , and n=15 indicate eight 1-MHz sub-channels. Generally, $R_i(n)$ of the STA on the newly allocated sub-channel is greater than $R_{i,QoS}$ required by the STA.

(2) Within a beacon period $T_{BI}$, a sum of channel access time of all STAs to be allocated to each sub-channel n is not greater than an available access time $T_{available}(n)$ of the sub-channel n.

When the wireless video surveillance network is deployed, the access point divides, according the foregoing order of the sub-channel combinations, the channel from 779 MHz to 787 MHz into sub-channels whose bandwidths are small. Alternatively, after the wireless video surveillance network is configured, during normal running, if load exceeds a load bearing limit of the network, the existing wireless surveillance network is optimized according to the multi-transceiver configuration method provided in this embodiment of the present invention.

Figure 2:
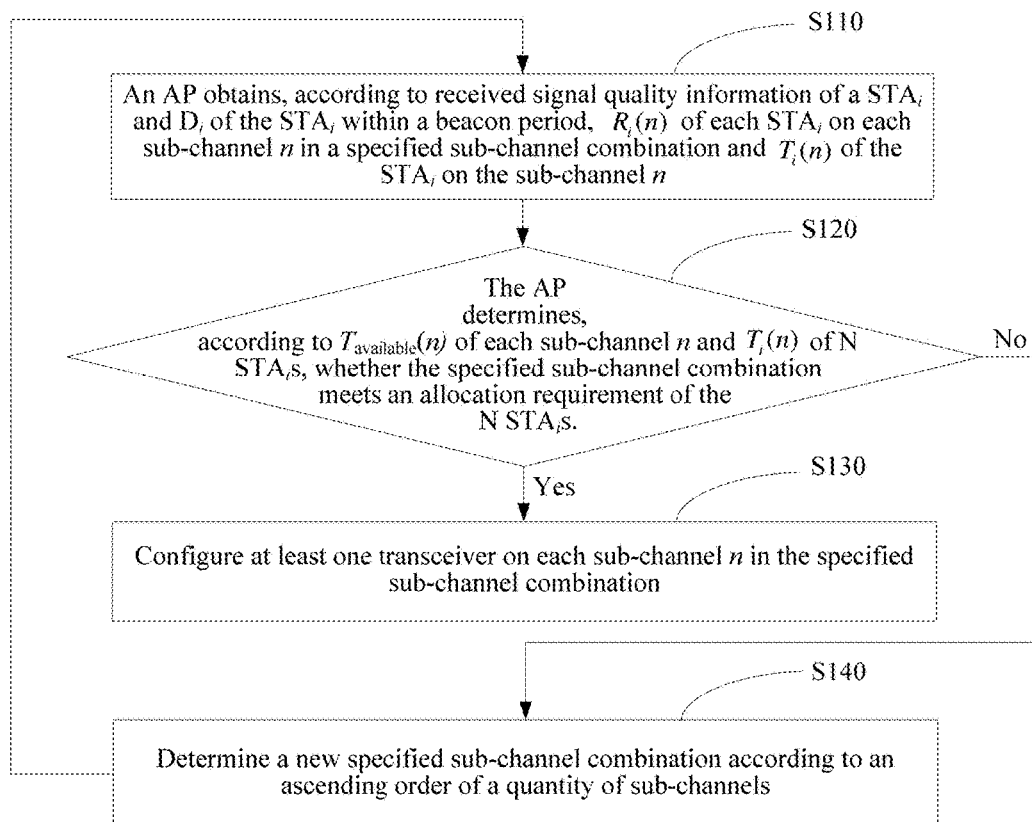
FIG. 2 is a schematic flowchart of a multi-transceiver configuration method according to an embodiment of the present invention.

Referring to FIG. 2, FIG. 2 is a schematic flowchart of a multi-transceiver configuration method according to an embodiment of the present invention. The method is applied to an AP of the Internet of Things. It is assumed that a coverage area of the AP includes N STAs, and a $STA_i$ is used to represent any STA within the coverage area of the AP, where 1≤i≤N, N is a quantity of STAs within the coverage area of the AP, and N is a positive integer greater than 1.

As shown in FIG. 2, the multi-transceiver configuration method includes the following steps.

S110: The AP obtains, according to received signal quality information of the $STA_i$ and an average data volume of the $STA_i$ within a beacon period, $R_i(n)$ of the $STA_i$ on each sub-channel n in a specified sub-channel combination and a channel access time $T_i(n)$ of the STA on the sub-channel n.

The AP determines the specified sub-channel combination according to the foregoing order of (1) to (9) or (I) to (IV).

The received signal quality information may include information about a received signal strength indicator (RSSI) of the $STA_i$ or information about a received signal-to-noise ratio of the $STA_i$.

First, the AP obtains received signal quality information of each $STA_i$ (for example, an RSSI of the $STA_i$).

During system optimization, the AP already communicates with the STA, and in this application scenario, the AP can determine the RSSI of the STA according to a signal sent by the STA. During initial system configuration, the AP may perform signal testing on the STA or perform estimation by using a distance between the AP and the STA, to obtain the RSSI of the STA.

Then the AP queries a table of minimum sensitivities of a receiver according to the RSSI of each $STA_i$ to obtain $R_i(n)$ of each $STA_i$ on the sub-channel n. For details of content of a table of minimum sensitivities of a transceiver, refer to related content in Table 1 to Table 3 in the following.

After obtaining $R_i(n)$ of the $STA_i$ on the sub-channel n, the AP obtains the channel access time $T_i(n)$ of the $STA_i$ on the sub-channel n according to the average data volume $D_i$ needing to be sent by the $STA_i$ within the beacon period and $R_i(n)$ of the $STA_i$ on the sub-channel n.

$D_i$ of the $STA_i$ within the beacon period is a product of $R_{i,QoS}$ of the $STA_i$ and the beacon period $T_{BI}$, as shown in a formula 1:

$$D_i = R_{i,QoS} \times T_{BI} \quad \text{(formula 1)}$$

$R_{i,QoS}$ is one of QoS (Quality of Service) parameters of the STA. The AP may obtain $R_{i,QoS}$ from a received latest TSPEC (Traffic Specification) element sent by the $STA_i$, where the TSPEC element includes $R_{i,QoS}$.

The AP calculates, according to a formula 2, the channel access time $T_i(n)$ required by the $STA_i$ for transmitting $D_i$ on the sub-channel n:

$$T_i(n) = \frac{T_{BI} * R_{i,QoS}}{R_i(n)} \quad \text{(formula 2)}$$

S120: The AP determines, according to $T_{available}(n)$ of each sub-channel n and $T_i(n)$ of N $STA_i$s, whether the specified sub-channel combination meets an allocation requirement of the N $STA_i$s; and if the allocation requirement is met, perform step S130; otherwise, perform step S140.

In an embodiment of the present invention, step S120 may include the following steps.

1) The AP determines, according to $T_{available}(n)$ of each sub-channel n and $T_i(n)$ of each $STA_i$, a $STA_i$ to be allocated to each sub-channel n.

Optionally, the $STA_i$s may be allocated to each sub-channel one by one according to a descending order of bandwidths of sub-channels in the specified sub-channel combination. When the $STA_i$s are allocated to a sub-channel, the $STA_i$s may be allocated according to a descending order of $R_i(n)$ of the $STA_i$s on the sub-channel n; or the $STA_i$s may be allocated according to an ascending order of $T_i(n)$ required by the $STA_i$s on the sub-channel n.

Optionally, the $STA_i$s may be allocated to each sub-channel one by one according to an ascending order of bandwidths of sub-channels in the specified sub-channel combination.

Because each $STA_i$ on a same sub-channel multiplexes the sub-channel in a time division manner, when the AP allocates the $STA_i$s to each sub-channel, it must be ensured that a sum $$\sum_{i \in A_n} T_i(n)$$

of channel access time of all $STA_i$s on the same sub-channel is not greater than $T_{available}(n)$ of the sub-channel, where $A_n$ indicates a set of STAs allocated to the sub-channel n.

After allocating the $STA_i$s to each sub-channel, each $STA_i$ sends data to the AP on the sub-channel of the $STA_i$ according to a bandwidth of the current sub-channel in a fixed bandwidth manner. For example, if a $STA_i$ is allocated to a 4-MHz sub-channel, the $STA_i$ always sends data to the AP by using a 4-MHz bandwidth.

2) If $T_{available}(n)$ of each sub-channel n is used and there is a $STA_i$ that is not allocated to any sub-channel, determine that the specified sub-channel combination does not meet the allocation requirement of the N $STA_i$s.

3) If there is no $STA_i$ that is not allocated to any sub-channel, and a sum of access time of $STA_i$s on each sub-channel n is not greater than $T_{available}(n)$ of the sub-channel n, determine that the specified sub-channel combination meets the allocation requirement of the N $STA_i$s.

S130: Configure at least one transceiver on each sub-channel n in the specified sub-channel combination.

If the specified sub-channel combination does not meet the allocation requirement of the N $STA_i$s, in S140, a new specified sub-channel combination is determined according to an ascending order of a quantity of sub-channels; and return to perform step S110. When the new specified sub-channel combination meets the allocation requirement of the N $STA_i$s, at least one transceiver is configured for each sub-channel, to which the $STA_i$ is allocated, in the new specified sub-channel combination.

In the multi-transceiver configuration method for an access point provided in this embodiment, an access point obtains $R_i(n)$ of a $STA_i$ on a sub-channel n in a specified sub-channel combination, and calculates $T_i(n)$ required by the $STA_i$ for transmitting an average data volume on the sub-channel n, and when the specified sub-channel combination manner meets an allocation requirement of N $STA_i$s, the access point configures at least one transceiver for each sub-channel n in the specified sub-channel combination. Configuring multiple parallel transceivers on an access point side to implement parallel transmissions of the $STA_i$s is equivalent to increasing channel access time. In addition, after a channel bandwidth is decreased, a data transfer rate of the STA can be increased generally. Therefore, by means of parallel running of multiple transceivers, a network throughput can be improved.

Figure 3:
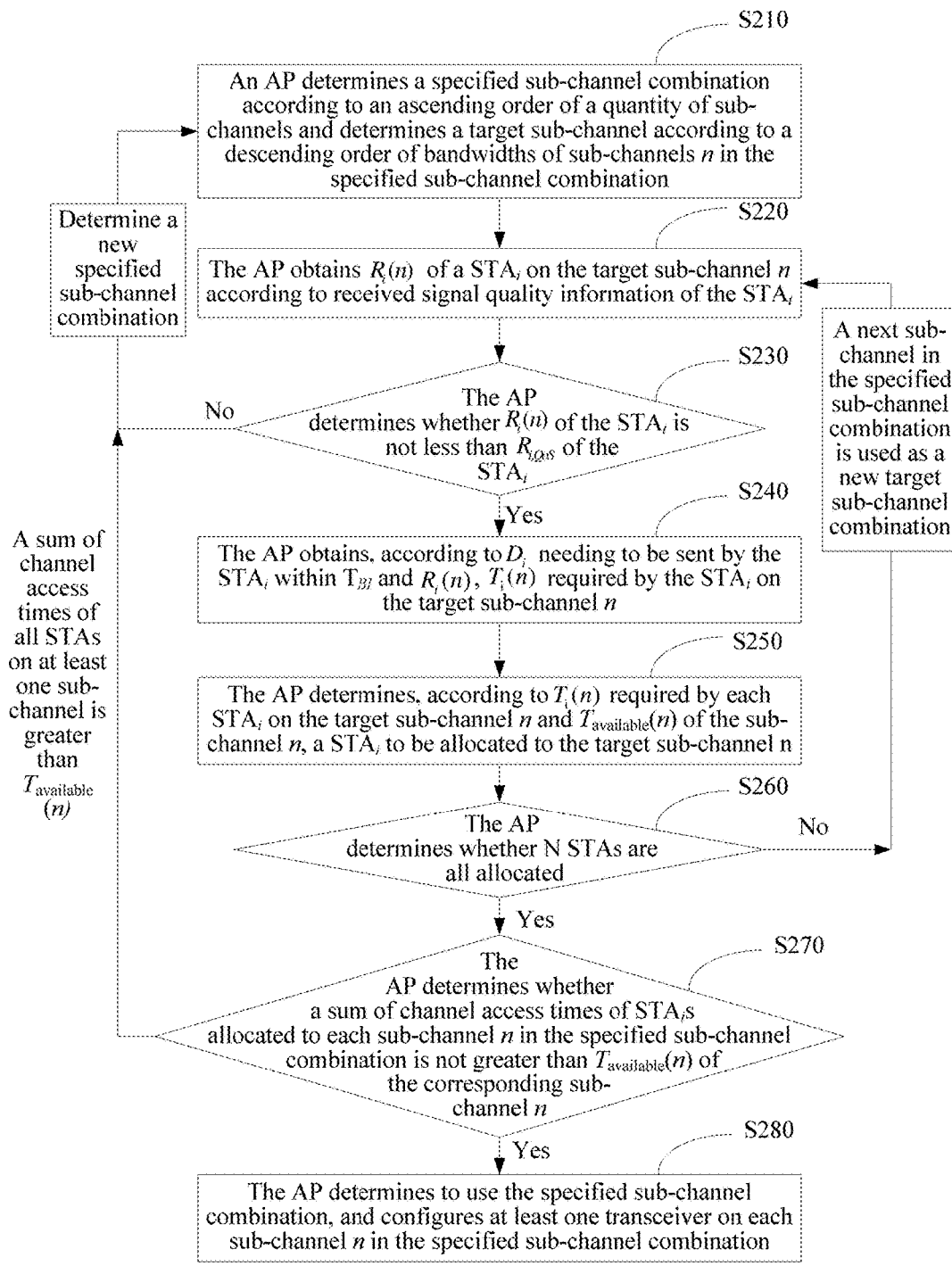
FIG. 3 is a schematic flowchart of another multi-transceiver configuration method according to an embodiment of the present invention.

Referring to FIG. 3, FIG. 3 is a schematic flowchart of another transceiver configuration method according to an embodiment of the present invention. The method is applied to an AP of the Internet of Things. It is assumed that a coverage area of the AP includes N STAs, where N is a positive integer greater than 1.

S210: The AP determines a specified sub-channel combination according to an ascending order of a quantity of sub-channels and determines a target sub-channel according to a descending order of bandwidths of sub-channels n in the specified sub-channel combination.

The specified sub-channel combination is determined according to the above-mentioned order of the sub-channel combination manners shown in (1) to (9) or (I) to (IV).

Further, when a target sub-channel is determined from the specified sub-channel combination, in this embodiment, the target sub-channel may be determined according to the descending order of the bandwidths of the sub-channels. Assuming that the specified sub-channel combination is one 4-MHz sub-channel and two 2-MHz sub-channels, first, the 4-MHz sub-channel is determined as the target sub-channel, then one of the two 2-MHz sub-channels is determined as a new target sub-channel, and finally, the other of the two 2-MHz sub-channels is determined as a new target sub-channel.

S220: The AP obtains $R_i(n)$ of a $STA_i$ on the target sub-channel according to received signal quality information of the $STA_i$.

S230: The AP determines whether $R_i(n)$ of the $STA_i$ on the target sub-channel n is not less than $R_{i,QoS}$ of the $STA_i$; if yes, perform S240; otherwise, return to perform S210, and determine a new specified sub-channel combination according to the ascending order of the quantity of sub-channels.

When a $STA_i$ is allocated to the target sub-channel n, it must be ensured that $R_i(n)$ of the $STA_i$ on the target sub-channel n is not less than $R_{i,QoS}$. Only in this way, a data transfer requirement of the $STA_i$ can be ensured, that is, the $STA_i$ may run on the sub-channel n. If $R_i(n)$ of the $STA_i$ on the sub-channel n is less than $R_{i,QoS}$, it indicates that the $STA_i$ cannot run on the sub-channel n. Generally, a maximum data transfer rate $R_i(n)$ of a STA on a newly allocated sub-channel is greater than an average data transfer rate $R_{i,QoS}$ required by the STA.

S240: The AP obtains, according to $D_i$ needing to be sent by the $STA_i$ within a beacon period and $R_i(n)$, $T_i(n)$ required by the $STA_i$ on the target sub-channel.

S250: The AP determines, according to $T_i(n)$ required by each $STA_i$ on the target sub-channel n and $T_{available}(n)$ of the target sub-channel n, a $STA_i$ to be allocated to the target sub-channel n.

S260: The AP determines whether the N STAs are all allocated; if yes, perform S270; and if not, determine a new target sub-channel in the specified sub-channel combination according to the descending order of the bandwidths of the sub-channels, then return to perform S220, and repeatedly perform steps S220 to S250 to determine $STA_i$s to be allocated to the new target sub-channel until all terminals are allocated.

In the foregoing example, after a $STA_i$ to be allocated to the 4-MHz sub-channel is determined, if there is still a $STA_i$ that is not allocated, a $STA_i$ to be allocated to the 2-MHz sub-channel is determined according to the foregoing method until all $STA_i$s are allocated.

S270: The AP determines whether a sum of channel access time of $STA_i$s allocated to each sub-channel n in the specified sub-channel combination is not greater than $T_{available}(n)$ of the corresponding sub-channel n; if yes, perform S280; and if a sum of channel access time of all $STA_i$s allocated to at least one sub-channel in the specified sub-channel combination is greater than $T_{available}(n)$ of the sub-channel n, return to perform S210, and determine a next sub-channel combination as a new specified sub-channel combination.

It should be noted that, because when $STA_i$s to be allocated to first several sub-channels in the specified sub-channel combination are determined, $STA_i$s are allocated to a sub-channel according to $T_{available}(n)$ of the sub-channel, whether a sum of channel access time of the $STA_i$s on the channel is not greater than $T_{available}(n)$ does not need to be repeatedly calculated, and only whether a sum of channel access time of all $STA_i$s on a last sub-channel in the specified sub-channel combination is not greater than $T_{available}(n)$ needs to be calculated.

S280: The AP determines to use the specified sub-channel combination, and configures at least one transceiver on each sub-channel n in the specified sub-channel combination.

After the sub-channel combination is determined, a quantity of transceivers needing to be configured by the AP can be determined. The AP configures a transceiver for each sub-channel in the specified sub-channel combination.

A standby transceiver may be further configured for a sub-channel. When a transceiver corresponding to the sub-channel is damaged, the standby transceiver is enabled, thereby ensuring uninterrupted communication of the $STA_i$.

Optionally, when there is a small quantity of STAs, no STA may be allocated to a sub-channel whose bandwidth is relatively small. In this case, the AP only needs to configure a transceiver for a sub-channel to which a STA is allocated, and does not need to configure a transceiver for the sub-channel to which no STA is allocated.

In this embodiment of the present invention, step S250 may be implemented in the following two manners.

In one manner, the $STA_i$s may be allocated to the target sub-channel n one by one according to a descending order of $R_i(n)$ of the $STA_i$s on the target sub-channel n, and when $T_{available}(n)$ of the target sub-channel n is used, all $STA_i$s to run on the target sub-channel n are determined.

$R_i(n)$ of the $STA_i$s is arranged in a descending order, and a sum of $T_i(n)$ of first i STAs is calculated according to the order. When the sum of $T_i(n)$ is greater than $T_{available}(n)$ of the target sub-channel n and a sum of $T_i(n)$ of first (i−1) STAs is not greater than $T_{available}(n)$ of the target sub-channel n, it is determined that the first (i−1) STAs are allocated to the target sub-channel n.

It is assumed that a descending order of data transfer rates of five $STA_i$s from a $STA_1$ to a $STA_5$ on a 4-MHz sub-channel (a corresponding sub-channel when n=2) is $R_1(2)=R_2(2)>R_3(2)>R_4(2)>R_5(2)$. Moreover, it is known that channel access time of the $STA_1$ to the $STA_5$ on the 4-MHz channel (n=2) are respectively $T_1$ to $T_5$. Whether a sum of the channel access time of the $STA_1$ to the $STA_5$ is less than an available access time $T_{available}(2)$ of the 4-MHz sub-channel (n=2) is determined in a successive accumulation manner. If it is obtained through calculation that $T_1(2)+T_2(2)<T_{available}(2)$, and $T_1(2)+T_2(2)+T_3(2)>T_{available}(2)$, it is determined that the $STA_1$ and the $STA_2$ are to run on the 4-MHz sub-channel.

Generally, when a transmit power of a $STA_i$ is fixed, a smaller channel bandwidth of the $STA_i$ indicates a higher received signal-to-noise ratio of the AP, a higher MCS level that can be used, and more improvement in corresponding frequency spectrum usage. Therefore, to resolve a problem in a network that an entire throughput and delay performance of the network do not meet QoS requirements due to a low-rate $STA_i$, a $STA_i$ having a relatively small maximum data transfer rate is preferentially allocated to a sub-channel whose bandwidth is relatively small to improve frequency spectrum usage of the network to a maximum extent, thereby meeting delay requirements of high-definition video streams of all $STA_i$s.

In another manner, the AP may allocate the $STA_i$s to the target sub-channel n one by one according to an ascending order of $T_i(n)$ of the $STA_i$s on the target sub-channel n. When $T_{available}(n)$ of the target sub-channel n is used, all $STA_i$s to run on the target sub-channel n are determined.

In this embodiment, according to the descending order of the channel access time of the $STA_i$s on the target sub-channel n, a $STA_i$ that needs a relatively long channel access time is preferentially allocated to a sub-channel whose bandwidth is relatively small, so that frequency spectrum usage of the network is improved to a maximum extent, thereby meeting delay requirements of high-definition video streams of all $STA_i$s.

The sum of channel access time of first i $STA_i$s is calculated in a successive accumulation manner according to an ascending order of $T_i(n)$ of the $STA_i$s on the target sub-channel n. The foregoing example is still used in the following for description.

First, a $STA_i$ to be allocated to a 4-MHz sub-channel (n=2) is determined, and if $T_1(2)+T_2(2)+T_3(2)<T_{available}(2)$, and $T_1(2)+T_2(2)+T_3(2)+T_4(2)>T_{available}(2)$, it is determined that the $STA_1$ to the $STA_3$ are to run on the 4-MHz sub-channel.

Then, a $STA_i$ to be allocated to a 2-MHz sub-channel is determined, and if $T_4(4)<T_{available}(4)$, and $T_4(4)+T_5(4)<T_{available}(4)$, it is determined that the $STA_4$ is allocated to one 2-MHz sub-channel (n=4), and the $STA_5$ is allocated to another 2-MHz (n=5) sub-channel.

By means of the $STA_i$ allocation method provided in this embodiment, according to a descending order of channel access time of $STA_i$s on a target sub-channel, a $STA_i$ that needs a relatively long channel access time is preferentially allocated to a sub-channel whose bandwidth is relatively small, so that frequency spectrum usage of a network is improved to a maximum extent, thereby meeting delay requirements of high-definition video streams of all $STA_i$s.

The following describes the foregoing embodiment of the multi-transceiver configuration method by using a specific example.

Assuming that there are 10 video surveillance STAs whose high-definition video source rates are 1.5 Mbps in an area covered by an AP, the 10 STAs all run on an 8-MHz channel at the beginning, and a net throughput is 1.5 Mbps×10=15 Mbps. Considering overheads of a control frame such as a block acknowledgment B-ACK frame, and a management frame, it is assumed that the overheads account for 20% of the net throughput. Therefore, only when an actual network throughput is greater than 15 Mbps/0.8=18 Mbps, that is, an actual transmit rate of each STA is greater than 1.8 Mbps, QoS parameter requirements such as delays of all high-definition video streams can be met.

After rounding down RSSIs corresponding to a $STA_1$ to a $STA_{10}$, the rounded-down RSSIs are −70 dBm, −70 dBm, −70 dBm, −73 dBm, −73 dBm, −73 dBm, −73 dBm, −74 dBm, −77 dBm, and −81 dBm in sequence. MCS levels used by the 10 STAs on the 8-MHz channel may be determined according to a table of minimum input sensitivities of a receiver shown in Table 1. Then, according to specific information about MCSs of an 8-MHz channel shown in Table 2 and specific information about MCSs of a 4-MHz channel shown in Table 3, data transfer rates of the 10 $STA_i$s on the 8-MHz channel and the 4-MHz channel are separately determined.

In Table 1, Modulation scheme is a modulation and coding scheme. Bit rate is a bit rate of a modulation and coding scheme. Minimum input sensitivity (1-MHz PPDU) indicates a minimum input sensitivity on a 1-MHz sub-channel. Minimum input sensitivity (2-MHz PPDU) indicates a minimum input sensitivity on a 2-MHz sub-channel. Minimum input sensitivity (4-MHz PPDU) indicates a minimum input sensitivity on a 4-MHz sub-channel. Minimum input sensitivity (8-MHz PPDU) indicates a minimum input sensitivity on an 8-MHz sub-channel. PPDU indicates a physical layer convergence procedure (PLCP) protocol data unit.

TABLE 1

| Modulation scheme | Bit rate | Minimum input sensitivity (1-MHz PPDU) (dBm) | Minimum input sensitivity (2-MHz PPDU) (dBm) | Minimum input sensitivity (4-MHz PPDU) (dBm) | Minimum input sensitivity (8-MHz PPDU) (dBm) |
|---|---|---|---|---|---|
| BPSK | 1/2 & 2 × repetition | −98 | n.a. | n.a. | n.a. |
| BPSK | 1/2 | −95 | −92 | −89 | −86 |
| QPSK | 1/2 | −92 | −89 | −86 | −83 |
| QPSK | 3/4 | −90 | −87 | −84 | −81 |
| 16-QAM | 1/2 | −87 | −84 | −81 | −78 |
| 16-QAM | 3/4 | −83 | −80 | −77 | −74 |
| 64-QAM | 2/3 | −79 | −76 | −73 | −70 |
| 64-QAM | 3/4 | −78 | −75 | −72 | −69 |
| 64-QAM | 5/6 | −77 | −74 | −71 | −68 |
| 256-QAM | 3/4 | −72 | −69 | −66 | −63 |
| 256-QAM | 5/6 | −70 | −67 | −64 | −61 |

TABLE 2

| MCS ID | Modulation scheme | Bit rate | Data rate (Kbps) 8-μs guard interval | Data rate (Kbps) 4-μs guard interval |
|---|---|---|---|---|
| 0 | BPSK | 1/2 | 2925 | 3250 |
| 1 | QPSK | 1/2 | 5850 | 6500 |
| 2 | QPSK | 3/4 | 8775 | 9750 |
| 3 | 16-QAM | 1/2 | 11700 | 13000 |
| 4 | 16-QAM | 3/4 | 17550 | 19500 |
| 5 | 64-QAM | 2/3 | 23400 | 26000 |
| 6 | 64-QAM | 3/4 | 26325 | 29250 |
| 7 | 64-QAM | 5/6 | 29250 | 32500 |
| 8 | 256-QAM | 3/4 | 35100 | 39000 |
| 9 | 256-QAM | 5/6 | 39000 | 43333 |

Table 2 shows correspondences between modulation and coding scheme levels on an 8-MHz sub-channel and corresponding data transfer rates. In Table 2, MCS ID indicates a number of a modulation and coding scheme. Modulation scheme indicates a modulation and coding scheme. Bit rate indicates a bit rate corresponding to a modulation and coding scheme. Data rate (Kbps) indicates a data transfer rate of a STAi on an 8-MHz sub-channel, and a unit symbol is Kbps. 8-μs Guard interval indicates that a guard interval in a modulation scheme is 8 μs; and 4-μs Guard interval indicates that a guard interval in a modulation scheme is 4 μs.

Table 3 shows correspondences between modulation and coding scheme levels on a 4-MHz sub-channel and corresponding data transfer rates. Meanings of items in Table 3 are the same as those in Table 2, and details are not described herein again.

TABLE 3

| MCS ID | Modulation scheme | Bit rate | Data rate (Kbps) | |
|---|---|---|---|---|
| | | | 8-μs guard interval | 4-μs guard interval |
| 0 | BPSK | 1/2 | 1350 | 1500 |
| 1 | QPSK | 1/2 | 2700 | 3000 |
| 2 | QPSK | 3/4 | 4050 | 4500 |
| 3 | 16-QAM | 1/2 | 5400 | 6000 |
| 4 | 16-QAM | 3/4 | 8100 | 9000 |
| 5 | 64-QAM | 2/3 | 10800 | 12000 |
| 6 | 64-QAM | 3/4 | 12150 | 13500 |
| 7 | 64-QAM | 5/6 | 13500 | 15000 |
| 8 | 256-QAM | 3/4 | 16200 | 18000 |
| 9 | 256-QAM | 5/6 | 18000 | 20000 |

Because when the 10 $STA_i$s are running on the 8-MHz channel, a corresponding actual network throughput does not meet a network throughput QoS requirement, first, an attempt is made to allocate the $STA_i$s to two 4-MHz sub-channels. For the 10 $STA_i$s, highest-order 4-MHz PPDU MCSs under 10% packet loss rate conditions and corresponding required channel access time is shown in Table 4.

TABLE 4

| | RSSI | MCS | $R_i$ (4 MHz) (Mbps) | $T_i$ (4 MHz) (s) |
|---|---|---|---|---|
| $STA_1$ | −70 | 64-QAM (R = 5/6) | 13.5 | 0.133 $T_{BI}$ |
| $STA_2$ | −70 | 64-QAM (R = 5/6) | 13.5 | 0.133 $T_{BI}$ |
| $STA_3$ | −70 | 64-QAM (R = 5/6) | 13.5 | 0.133 $T_{BI}$ |
| $STA_4$ | −73 | 64-QAM (R = 2/3) | 10.8 | 0.167 $T_{BI}$ |
| $STA_5$ | −73 | 64-QAM (R = 2/3) | 10.8 | 0.167 $T_{BI}$ |
| $STA_6$ | −73 | 64-QAM (R = 2/3) | 10.8 | 0.167 $T_{BI}$ |
| $STA_7$ | −73 | 64-QAM (R = 2/3) | 10.8 | 0.167 $T_{BI}$ |
| $STA_8$ | −74 | 64-QAM (R = 3/4) | 8.1 | 0.222 $T_{BI}$ |
| $STA_9$ | −77 | 64-QAM (R = 3/4) | 8.1 | 0.222 $T_{BI}$ |
| $STA_{10}$ | −81 | 16-QAM (R = 1/2) | 5.4 | 0.333 $T_{BI}$ |

According to a descending order of data transfer rates of the 10 $STA_i$s on the 4-MHz sub-channels, channel access time required by the $STA_i$s on the 4-MHz sub-channels, and available access time of the 4-MHz sub-channels, $STA_i$s to be allocated to the two 4-MHz sub-channels are determined. Assuming that the available access time of the two 4-MHz sub-channels are respectively 0.98 $T_{BI}$ and 0.97 $T_{BI}$, it can be learned through calculation that, a sum of channel access time of six $STA_i$s from a $STA_1$ to a $STA_6$ is 0.9 $T_{BI}$, and is less than 0.98 $T_{BI}$; and a sum of channel access time of four $STA_i$s from a $STA_7$ to a $STA_{10}$ is 0.94 $T_{BI}$, and is less than 0.97 $T_{BI}$. It can be learned from the foregoing that, after the 10 $STA_i$s are allocated to the two 4-MHz sub-channels, an actual network throughput is 18 Mbps and can meet a network throughput requirement. In addition, only two transceivers need to be configured on an AP side.

Corresponding to the foregoing multi-transceiver configuration method, an embodiment of the present invention further provides an embodiment of a multi-transceiver channel multiplexing method. The method is applied to an AP. The AP determines, by using the multi-transceiver configuration method shown in FIG. 2 or FIG. 3, a quantity of transceivers that need to be configured by the AP. After configuring the transceiver, the AP needs to notify each $STA_i$ of a sub-channel on which the $STA_i$ is to run and a modulation and coding scheme to be used by the $STA_i$.

The multi-transceiver channel multiplexing method includes the following. The AP sends, by using a transceiver configured on each sub-channel, a channel allocation indication message to a $STA_i$ allocated to the sub-channel. The channel allocation indication message includes information about the sub-channel allocated to the $STA_i$ and scheduling information, so that the $STA_i$ communicates, according to the information about the sub-channel and the scheduling information, with the transceiver on the sub-channel on which the $STA_i$ is located. Each $STA_i$ sends data to the AP only on the sub-channel of the $STA_i$ in a fixed bandwidth manner according to a bandwidth of the current sub-channel.

After determining a $STA_i$ allocation status on each sub-channel, the AP sends a channel allocation indication message to a $STA_i$, to notify, by using the channel allocation indication message, the $STA_i$ of information about a sub-channel allocated to the $STA_i$ and scheduling information. The information about the sub-channel includes a modulation and coding scheme needing to be used by the $STA_i$.

The channel allocation indication message may be an information element, and the information element needs to be inserted into another message to be sent to the $STA_i$. In another embodiment, the channel allocation indication message may be an independent message that may be independently sent by the AP to the $STA_i$.

FIG. 4 is a schematic diagram of a data message format when a channel allocation indication message is an information element. As shown in FIG. 4, the channel allocation indication message includes: an element ID, a length, an allocation field 1, an allocation field 2, . . . , and an allocation field N. The length indicates a length of the channel allocation indication message, and the allocation field indicates information about a sub-channel allocated by an AP to a $STA_i$. The channel allocation indication message also includes channel allocation information of all STAs within a coverage area of the AP, and is sent to each $STA_i$ in a broadcast manner.

FIG. 5 shows a message format of each allocation field in a channel allocation indication message. The allocation field includes a new modulation and coding scheme and scheduling information controlling a $STA_i$ to switch a channel. As shown in FIG. 5, the allocation field includes: an allocation control field, a STA AID (Association Identifier), a new channel number, a new STA AID, a new AP MAC (Media Access Control) address, a new AP AID, a new MCS number, and a channel switching count.

The allocation control field is a control field of the allocation field in the channel allocation indication message; the STA AID is an AID of a STA; the new channel number is a number of a new sub-channel allocated by an AP to a STA; the new STA AID is an AID reallocated by the AP to the STA; the new AP MAC address is a MAC address of a transceiver corresponding to the new sub-channel allocated to the STA, where multiple transceivers are configured for an AP, and different transceivers correspond to different MAC addresses; the new AP AID is an AID of the transceiver corresponding to the new sub-channel allocated to the STA; the new MCS number is a number of a new MCS used by the STA after the STA switches to the new sub-channel; and the channel switching count is a quantity of TBTTs (Target Beacon Transmission Time) for which the AP sending the channel allocation indication message needs to wait to switch to the new sub-channel, and is set to 0 or 1; when the channel switching count is set to 1, it indicates that switching occurs at a moment close to a next TBTT; and when the channel switching count is set to 0, it indicates that the switching occurs at any moment after a data frame including the channel allocation indication message is sent.

FIG. 6 is a schematic diagram of a message format of the allocation control field shown in FIG. 5. As shown in FIG. 6, the allocation control field includes: a pseudo-static SP, a UL (uplink) activity, a DL (downlink) activity, and a maximum transmission width.

For the pseudo-static SP (service period): when the pseudo-static SP is set to 1, it indicates that after switching to a new sub-channel is made, the SP still remains pseudo-static.

For the UL activity: when the UL activity is set to 1, it indicates that a STA associated with a new AP allows a frame that is not an immediate response frame to be sent on a new sub-channel; otherwise, the STA does not allow a frame that is not an immediate response frame to be sent on the new sub-channel.

For the DL activity: when the DL activity is set to 1, it indicates that an AP intends to send a frame that is not an immediate response frame on a new sub-channel; otherwise, it indicates that the AP does not intend to send a frame that is not an immediate response frame on the new sub-channel.

For the maximum transmission width: it indicates a maximum bandwidth of a PPDU that is allowed for transmission on a new sub-channel.

It should be noted that to ensure that after a STA switches to a new sub-channel, the STA can immediately communicate with an AP to transfer data, a channel allocation indication message delivered by the AP includes channel switching information, and scheduling information of a $STA_i$ within a first beacon period after channel switching. Then, the scheduling information of the $STA_i$ is delivered to the STA by a dedicated scheduling element.

Corresponding to the foregoing multi-transceiver channel multiplexing method applied to the AP, an embodiment of the present invention further provides a multi-transceiver channel multiplexing method applied to a STA. As shown in FIG. 7, the method may include the following steps.

S310: A $STA_i$ receives a channel allocation indication message delivered by an AP, where the channel allocation indication message includes a new modulation and coding scheme and scheduling information that correspond to the $STA_i$.

S320: The $STA_i$ sends data according to the new modulation and coding scheme; switches to a target sub-channel according to a channel switching time included in the scheduling information; and communicates, according to a MAC address and an AID that are corresponding to the target sub-channel and that are of the AP, with a transceiver on the target sub-channel.

Figure 8:
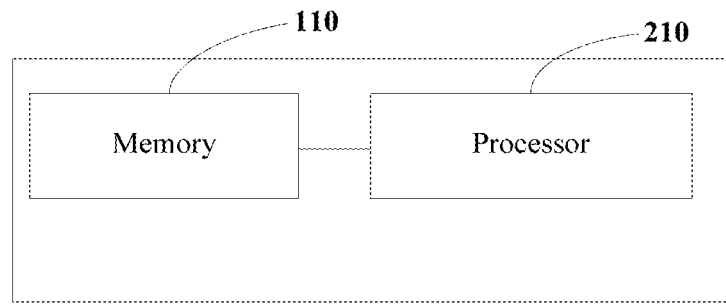
FIG. 8 is a schematic structural diagram of an access point according to an embodiment of the present invention.

The present invention provides an access point for implementing a multi-transceiver configuration method. FIG. 8 is a schematic structural diagram of an access point according to an embodiment of the present invention.

First, a frequency band of the Internet of Things is divided into multiple sub-channel combinations including any combination of a 1-MHz sub-channel, a 2-MHz sub-channel, a 4-MHz sub-channel, and an 8-MHz sub-channel. The Internet of Things corresponding to the access point includes N terminals $STA_i$s, where $1 \le i \le N$ and N is a positive integer greater than 1.

As shown in FIG. 8, the access point includes: a memory no and a processor 120. The memory no stores an executable instruction of the processor 120. The processor 120 executes the executable instruction to: for any $STA_i$ in the Internet of Things corresponding to the access point, obtain a maximum data transfer rate $R_i(n)$ of the $STA_i$ on each sub-channel n in a specified sub-channel combination according to received signal quality information of the $STA_i$; and obtain, according to an average data volume needing to be sent by the $STA_i$ within a beacon period and $R_i(n)$, a channel access time $T_i(n)$ required by the $STA_i$ on the sub-channel n; determine, according to an available access time $T_{available}(n)$ of each sub-channel n within the beacon period and $T_i(n)$ of the N $STA_i$s, whether the specified sub-channel combination meets an allocation requirement of the N $STA_i$s; and when it is determined that the specified sub-channel combination meets the allocation requirement of the N $STA_i$s, configure at least one transceiver on each sub-channel n in the specified sub-channel combination, where n=1 indicates an 8-MHz sub-channel; n=2 and n=3 indicate two 4-MHz sub-channels; n=4, n=5, n=6, and n=7 indicate four 2-MHz sub-channels; n=8, n=9, ..., and n=15 indicate eight 1-MHz sub-channels.

The access point for implementing the multi-transceiver configuration method provided in this embodiment obtains $R_i(n)$ of a $STA_i$ on a sub-channel n in a specified sub-channel combination, and calculates $T_i(n)$ required by the $STA_i$ for transmitting an average data volume on the sub-channel n. When the specified sub-channel combination manner meets an allocation requirement of N $STA_i$s, the access point configures at least one transceiver for each sub-channel n in the specified sub-channel combination. Configuring multiple parallel transceivers on an access point side to implement parallel transmissions of the $STA_i$s is equivalent to increasing channel access time. In addition, after a channel bandwidth is decreased, a data transfer rate of the STA can be increased generally. Therefore, by means of parallel running of multiple transceivers, a network throughput can be improved.

In an embodiment of the present invention, the processor 120 being configured to determine, according to $T_{available}(n)$ of each sub-channel n and $T_i(n)$ of the N $STA_i$s, whether the specified sub-channel combination meets the allocation requirement of the N $STA_i$s includes: determining, according to $T_{available}(n)$ of each sub-channel n and $T_i(n)$ of each $STA_i$ a $STA_i$ to be allocated to each sub-channel n; if $T_{available}(n)$ of each sub-channel n is used and there is a $STA_i$ that is not allocated to any sub-channel, determining that the specified sub-channel combination does not meet the allocation requirement of the N $STA_i$s; and if there is no $STA_i$ that is not allocated to any sub-channel, and a sum of access time of $STA_i$s on each sub-channel n is not greater than $T_{available}(n)$ of the sub-channel n, determining that the specified sub-channel combination meets the allocation requirement of the N $STA_i$s.

In an embodiment of the present invention, the processor 120 being configured to determine, according to $T_{available}(n)$ of the sub-channel n and $T_i(n)$ of the $STA_i$ the $STA_i$ to be allocated to each sub-channel n includes: determining, according to a descending order of $R_i(n)$ of the $STA_i$s on a target sub-channel or according to an ascending order of $T_i(n)$ required by the $STA_i$s on the target sub-channel, a $STA_i$ to run on the target sub-channel, and determining, when $T_{available}(n)$ of the target sub-channel within the beacon period is used, all $STA_i$s to be allocated to the target sub-channel; and when there is a $STA_i$ that is not allocated to any sub-channel, determining, according to a specified order, a new target sub-channel, and obtaining $R_i(n)$ of the $STA_i$ that is not allocated to any sub-channel on the target sub-channel until the $STA_i$s are all allocated or $T_{available}(n)$ of all sub-channels in the specified sub-channel combination is used.

Optionally, the processor 120 is further configured to: when it is determined that the specified sub-channel combination does not meet the allocation requirement of the N $STA_i$s, determine a new specified sub-channel combination according to an ascending order of a quantity of sub-channels, and obtain $R_i(n)$ and $T_i(n)$ of the $STA_i$ on each sub-channel in the new specified sub-channel combination; and when the new specified sub-channel combination meets the allocation requirement of the N $STA_i$s, configure at least one transceiver for each sub-channel, to which the $STA_i$ is allocated, in the new specified sub-channel combination.

In an embodiment of the present invention, the processor 120 being configured to obtain $R_i(n)$ of the $STA_i$ on each sub-channel n in the specified sub-channel combination according to the received signal quality information of the $STA_i$; and obtain, according to the average data of the $STA_i$ within the beacon period and $R_i(n)$, $T_i(n)$ required by the $STA_i$ on the sub-channel n includes: determining, according to a specified order, a target sub-channel from the specified sub-channel combination; obtaining, according to an average data rate $R_{i,QoS}$ included in a latest Traffic Specification TSPEC element sent by the $STA_i$, the average data volume of the $STA_i$ within the beacon period; obtaining $R_i(n)$ of the $STA_i$ on the target sub-channel according to the received signal quality information of the $STA_i$; and when it is determined that $R_i(n)$ of the $STA_i$ is greater than the average data transfer rate $R_{i,QoS}$ of the $STA_i$, obtaining, according to the average data volume of the $STA_i$ within the beacon period and $R_i(n)$, $T_i(n)$ required by the $STA_i$ on the target sub-channel.

Figure 9:
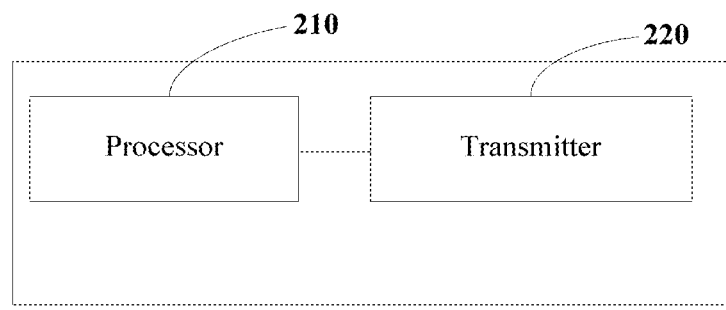
FIG. 9 is a schematic structural diagram of another access point according to an embodiment of the present invention.

The embodiments of the present invention further provide an access point for implementing a multi-transceiver channel multiplexing method. As shown in FIG. 9, the access point includes a processor 210 and a transmitter 220 connected to the processor.

The processor 210 is configured to determine, according to the foregoing multi-transceiver configuration method, to configure a transceiver and generate a channel allocation indication message.

The transmitter 220 is configured to send, by using a transceiver configured on a sub-channel n, the channel allocation indication message to a terminal $STA_i$ allocated to the sub-channel n. The channel allocation indication message includes a new modulation and coding scheme and scheduling information that correspond to the $STA_i$, so that the $STA_i$ sends data according to the new modulation and coding scheme, and communicates, according to the scheduling information, with the transceiver on the sub-channel on which the $STA_i$ is located.

n=1 indicates an 8-MHz sub-channel; n=2 and n=3 indicate two 4-MHz sub-channels; n=4, n=5, n=6, and n=7 indicate four 2-MHz sub-channels; n=8, n=9, . . . , and n=15 indicate eight 1-MHz sub-channels.

The scheduling information in the channel allocation indication message includes: information about a target sub-channel allocated to each $STA_i$, a channel switching time, a corresponding Media Access Control MAC address and a corresponding association identifier of the access point after the $STA_i$ switches to the target sub-channel, and a new association identifier of the $STA_i$ after the $STA_i$ switches to the target sub-channel.

The access point for implementing the multi-transceiver channel multiplexing method provided in this embodiment sends, after configuring a quantity of transceivers, a channel allocation indication message to $STA_i$s to notify each $STA_i$ of information about a sub-channel allocated to the $STA_i$ and scheduling information, so that the $STA_i$ communicates, according to the information about the sub-channel and the scheduling information, with a transceiver on the sub-channel on which the $STA_i$ is located.

Figure 10:
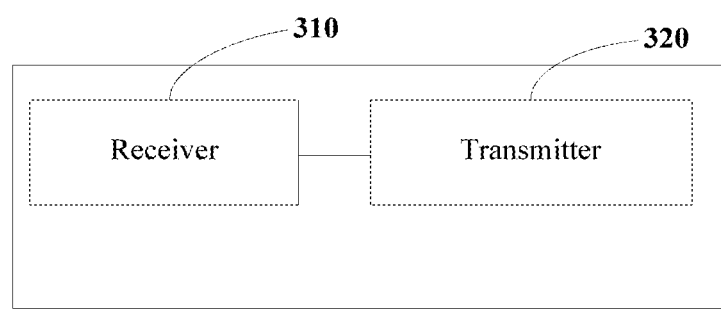
FIG. 10 is a schematic structural diagram of a terminal according to an embodiment of the present invention.

The embodiments of the present invention further provide a terminal for implementing a multi-transceiver channel multiplexing method. As shown in FIG. 10, the terminal may include: a receiver 310 and a transmitter 320.

The receiver 310 is configured to receive a channel allocation indication message delivered by an AP. The channel allocation indication message includes a new modulation and coding scheme and scheduling information that correspond to a $STA_i$.

The transmitter 320 is configured to: send data according to the new modulation and coding scheme; switch to a target sub-channel according to a channel switching time included in the scheduling information; and transmit, according to a Media Access Control (MAC) address and an association identifier that are corresponding to the target sub-channel and that are of the access point, information to a transceiver configured on the target sub-channel.

The terminal for implementing the multi-transceiver channel multiplexing method provided in this embodiment receives, by using a receiver, a channel allocation indication message delivered by an AP, and obtains information (a new modulation and coding scheme and new scheduling information) about a sub-channel allocated by the AP to the terminal. Then the terminal transmits, by using a transmitter according to the channel allocation indication message, information to a transceiver configured on a target sub-channel on which the terminal is located, thereby implementing parallel running of multiple terminals.

Figure 11:
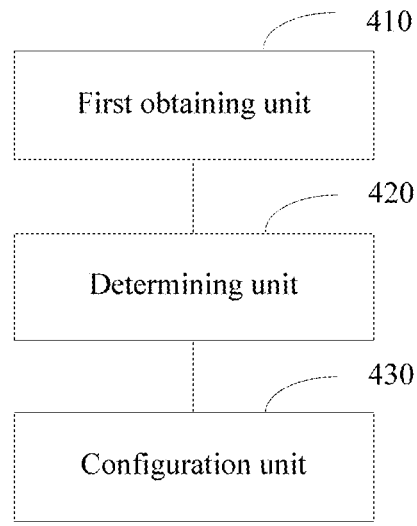
FIG. 11 is a schematic structural diagram of an access point according to an embodiment of the present invention.

Corresponding to the foregoing access point for implementing the multi-transceiver configuration method, as shown in FIG. 11, the access point may include: a first obtaining unit 410, a determining unit 420, and a configuration unit 430.

The first obtaining unit 410 is configured to: for any $STA_i$ in the Internet of Things corresponding to the access point, obtain a maximum data transfer rate $R_i(n)$ of the $STA_i$ on each sub-channel n in a specified sub-channel combination according to received signal quality information of the $STA_i$; and obtain, according to an average data volume needing to be sent by the $STA_i$ within a beacon period and $R_i(n)$, a channel access time $T_i(n)$ required by the $STA_i$ on the sub-channel n.

The determining unit 420 is configured to determine, according to an available access time $T_{available}(n)$ of each sub-channel n within the beacon period and $T_i(n)$ of the N $STA_i$s, whether the specified sub-channel combination meets an allocation requirement of the N $STA_i$s.

The configuration unit 430 is configured to: when it is determined that the specified sub-channel combination meets the allocation requirement of the N $STA_i$s, configure at least one transceiver on each sub-channel n in the specified sub-channel combination.

n=1 indicates an 8-MHz sub-channel; n=2 and n=3 indicate two 4-MHz sub-channels; n=4, n=5, n=6, and n=7 indicate four 2-MHz sub-channels; n=8, n=9, . . . , and n=15 indicate eight 1-MHz sub-channels.

The access point for implementing the multi-transceiver configuration method provided in this embodiment obtains $R_i(n)$ of a $STA_i$ on a sub-channel n in a specified sub-channel combination, and calculates $T_i(n)$ required by the $STA_i$ for transmitting an average data volume on the sub-channel n. When the specified sub-channel combination manner meets an allocation requirement of N $STA_i$s, the access point configures at least one transceiver for each sub-channel n in the specified sub-channel combination. Configuring multiple parallel transceivers on an access point side to implement parallel transmissions of the $STA_i$s is equivalent to increasing channel access time. In addition, after a channel bandwidth is decreased, a data transfer rate of the STA can be increased generally. Therefore, by means of parallel running of multiple transceivers, a network throughput can be improved.

In an embodiment of the present invention, the determining unit 420 is specifically configured to: determine, according to $T_{available}(n)$ of each sub-channel n and $T_i(n)$ of each $STA_i$, a $STA_i$ to be allocated to each sub-channel n; if $T_{available}(n)$ of each sub-channel n is used and there is a $STA_i$ that is not allocated to any sub-channel, determine that the specified sub-channel combination does not meet the allocation requirement of the N $STA_i$s; and if there is no $STA_i$ that is not allocated to any sub-channel, and a sum of access time of $STA_i$s on each sub-channel n is not greater than $T_{available}(n)$ of the sub-channel n, determine that the specified sub-channel combination meets the allocation requirement of the N $STA_i$s.

In an embodiment of the present invention, the determining unit 420 being configured to determine, according to $T_{available}(n)$ of the sub-channel n and $T_i(n)$ of the $STA_i$, the $STA_i$ to be allocated to each sub-channel n is specifically configured to: determine, according to a descending order of $R_i(n)$ of the $STA_i$s on a target sub-channel or according to an ascending order of $T_i(n)$ required by the $STA_i$s on the target sub-channel, a $STA_i$ to run on the target sub-channel, and determine, when $T_{available}(n)$ of the target sub-channel within the beacon period is used, all $STA_i$s to be allocated to the target sub-channel; and when there is a $STA_i$ that is not allocated to any sub-channel, determine, according to a specified order, a new target sub-channel, and obtain $R_i(n)$ of the $STA_i$ that is not allocated to any sub-channel on the target sub-channel until the $STA_i$s are all allocated or $T_{available}(n)$ of all sub-channels in the specified sub-channel combination is used.

Figure 12:
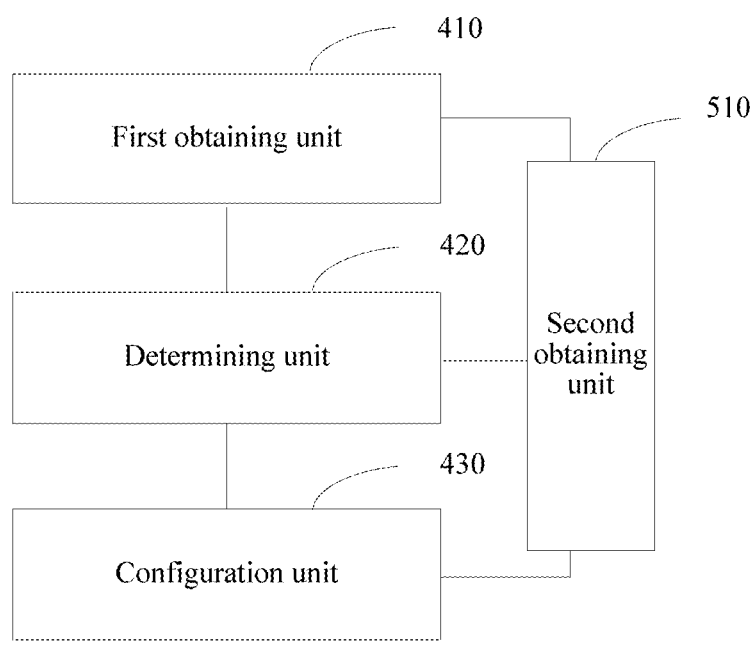
FIG. 12 is a schematic structural diagram of still another access point according to an embodiment of the present invention.

FIG. 12 is a schematic structural diagram of another access point according to an embodiment of the present invention. Based on the embodiment shown in FIG. 11, the access point further includes a second obtaining unit 510.

The second obtaining unit 510 is configured to: when it is determined that the specified sub-channel combination does not meet the allocation requirement of the N $STA_i$s, determine a new specified sub-channel combination according to an ascending order of a quantity of sub-channels, and enable the first obtaining unit 410 to obtain $R_i(n)$ and $T_i(n)$ of the $STA_i$ on each sub-channel in the new specified sub-channel combination; and when the new specified sub-channel combination meets the allocation requirement of the N $STA_i$s, control the configuration unit 430 to configure at least one transceiver for each sub-channel, to which the $STA_i$ is allocated, in the new specified sub-channel combination.

In an embodiment of the present invention, the first obtaining unit 410 is specifically configured to: determine, according to a specified order, a target sub-channel from the specified sub-channel combination; obtain, according to an average data rate $R_{i,QoS}$ included in a latest Traffic Specification (TSPEC) element sent by the $STA_i$, the average data volume of the $STA_i$ within the beacon period; obtain $R_i(n)$ of the $STA_i$ on the target sub-channel according to the received signal quality information of the $STA_i$; and when it is determined that $R_i(n)$ of the $STA_i$ is greater than the average data transfer rate $R_{i,QoS}$ of the $STA_i$, obtain, according to the average data volume of the $STA_i$ within the beacon period and $R_i(n)$, $T_i(n)$ required by the $STA_i$ on the target sub-channel.

The embodiments in this specification are all described in a progressive manner. For same or similar parts in the embodiments, reference may be made to these embodiments. Each embodiment focuses on a difference from other embodiments. Especially, apparatus or system embodiments are basically similar to a method embodiment, and therefore are described briefly. For related parts, reference may be made to partial descriptions in the method embodiment. The described apparatus and system embodiments are merely examples. The units described as separate parts may or may not be physically separate, and parts displayed as units may or may not be physical units, may be located in one position, or may be distributed on a plurality of network units. Some or all the modules may be selected according to actual needs to achieve the objectives of the solutions of the embodiments. A person of ordinary skill in the art may understand and implement the embodiments of the present invention without creative efforts.

The embodiments can be described in the general context of executable computer instructions executed by a computer, for example, a program module. Generally, a program module includes a routine, a program, an object, a component, a data structure, and the like for executing a particular task or implementing a particular abstract data type. The embodiments may also be practiced in distributed computing environments in which tasks are performed by remote processing devices that are connected through a communications network. In a distributed computing environment, program modules may be located in both local and remote computer storage media including storage devices.

It should be noted that in this specification, relational terms such as "first" and "second" are only used to distinguish one entity or operation from another, and do not necessarily require or imply that any actual relationship or sequence exists between these entities or operations. Moreover, the terms "include", "include", or their any other variants mean non-exclusive inclusion, so that a process, a method, an article, or a device that includes a list of elements not only includes those elements but also includes other elements which are not expressly listed, or further includes elements inherent to such process, method, article, or device. An element preceded by "includes a . . . " does not, without more constraints, preclude the existence of additional identical elements in the process, method, article, or device that includes the element.

The foregoing descriptions are merely specific implementation manners of the present invention. It should be noted that a person of ordinary skill in the art may make several improvements or polishing without departing from the principle of the present invention and the improvements or polishing shall fall within the protection scope of the present invention.

What is claimed is:

1. A transceiver configuration method for an access point, applied to the Internet of Things, wherein a frequency band of the Internet of Things is divided into a plurality of sub-channel combinations comprising a combination of a 1-MHz sub-channel, a 2-MHz sub-channel, a 4-MHz sub-channel, and an 8-MHz sub-channel, and the Internet of Things corresponding to the access point comprises N terminals $STA_i$s, wherein $1 \leq i \leq N$ and N is a positive integer greater than 1, and the method comprises:

for each $STA_i$ in the Internet of Things corresponding to the access point, obtaining, by the access point according to received signal quality information of the each $STA_i$, a maximum data transfer rate $R_i(n)$ of the each $STA_i$ on each sub-channel n in a specified sub-channel combination, and obtaining, according to an average data volume needing to be sent by the each $STA_i$ within a beacon period and $R_i(n)$, a channel access time $T_i(n)$ required by the each $STA_i$ on the sub-channel n;

determining, by the access point according to an available access time $T_{available}(n)$ of each sub-channel n within the beacon period and $T_i(n)$ of the N $STA_i$s, whether the specified sub-channel combination meets an allocation requirement of the N $STA_i$s; and when the access point determines that the specified sub-channel combination meets the allocation requirement of the N $STA_i$s, configuring a transceiver on each sub-channel n in the specified sub-channel combination;

wherein n=1 indicates an 8-MHz sub-channel, n=2 and n=3 indicate two 4-MHz sub-channels, wherein n=4, n=5, n=6, and n=7 indicate four 2-MHz sub-channels, and wherein n=8, n=9, . . . , and n=15 indicate eight 1-MHz sub-channels.

2. The method according to claim 1, wherein determining, by the access point according to $T_{available}(n)$ of each sub-channel n and $T_i(n)$ of the N $STA_i$s, whether the specified sub-channel combination meets the allocation requirement of the N $STA_i$s comprises:

determining, by the access point according to $T_{available}(n)$ of each sub-channel n and $T_i(n)$ of each $STA_i$, a $STA_i$ to be allocated to each sub-channel n;

when $T_{available}(n)$ of each sub-channel n is used and there is a $STA_i$ that is not allocated to any sub-channel, determining that the specified sub-channel combination does not meet the allocation requirement of the N $STA_i$s; and when there is no $STA_i$ that is not allocated to any sub-channel, and a sum of access time of $STA_i$s on each sub-channel n is not greater than $T_{available}(n)$ of the sub-channel n, determining that the specified sub-channel combination meets the allocation requirement of the N $STA_i$s.

3. The method according to claim 2, wherein determining, by the access point according to $T_{available}(n)$ of each sub-channel n and $T_i(n)$ of each $STA_i$, a $STA_i$ to be allocated to each sub-channel n comprises:

determining, by the access point according to a descending order of $R_i(n)$ of the $STA_i$s on a target sub-channel or according to an ascending order of $T_i(n)$ required by the $STA_i$s on the target sub-channel, a $STA_i$ to run on the target sub-channel, and determining, when $T_{available}(n)$ of the target sub-channel within the beacon period is used, all $STA_i$s to be allocated to the target sub-channel; and when there is a $STA_i$ that is not allocated to any sub-channel, determining, according to a specified order, a new target sub-channel, and obtaining $R_i(n)$ of the $STA_i$ that is not allocated to any sub-channel on the target sub-channel until the $STA_i$s are all allocated or $T_{available}(n)$ of all sub-channels in the specified sub-channel combination is used.

4. The method according to claim 1, further comprising:

when the access point determines that the specified sub-channel combination does not meet the allocation requirement of the N $STA_i$s, determining a new specified sub-channel combination according to an ascending order of a quantity of sub-channels, and obtaining $R_i(n)$ and $T_i(n)$ of the $STA_i$ on each sub-channel in the new specified sub-channel combination; and when the new specified sub-channel combination meets the allocation requirement of the N $STA_i$s, configuring a transceiver for each sub-channel, to which the $STA_i$ is allocated, in the new specified sub-channel combination.

5. The method according to claim 1, wherein obtaining, by the access point according to received signal quality information of the $STA_i$, $R_i(n)$ of the $STA_i$ on each sub-channel n in a specified sub-channel combination; and obtaining, according to an average data volume of the $STA_i$ within a beacon period and $R_i(n)$, $T_i(n)$ required by the $STA_i$ on the sub-channel n comprises:

determining, by the access point according to a specified order, a target sub-channel from the specified sub-channel combination;

obtaining, by the access point according to an average data rate $R_{i,QoS}$ comprised in a latest Traffic Specification (TSPEC) element sent by the $STA_i$, an average data volume of the $STA_i$ within the beacon period;

obtaining, by the access point according to the received signal quality information of the $STA_i$, $R_i(n)$ of the $STA_i$ on the target sub-channel; and when the access point determines that $R_i(n)$ of the $STA_i$ is greater than the average data transfer rate $R_{i,QoS}$ of the $STA_i$, obtaining, according to the average data volume of the $STA_i$ within the beacon period and $R_i(n)$, $T_i(n)$ required by the $STA_i$ on the target sub-channel.

6. The method according to claim 1, wherein a sub-channel combination of a frequency band from 779 MHz to 787 MHz of the Internet of Things comprises:

one 8-MHz sub-channel;

two 4-MHz sub-channels;

one 4-MHz sub-channel and two 2-MHz sub-channels, one 4-MHz sub-channel, one 2-MHz sub-channel, and two 1-MHz sub-channels, and four 2-MHz sub-channels;

one 4-MHz sub-channel and four 1-MHz sub-channels;

three 2-MHz sub-channels and two 1-MHz sub-channels;

two 2-MHz sub-channels and four 1-MHz sub-channels;

one 2-MHz sub-channel and six 1-MHz sub-channels; or eight 1-MHz sub-channels; or wherein a sub-channel combination of the frequency band from 779 MHz to 787 MHz of the Internet of Things comprises:

one 8-MHz sub-channel;

two 4-MHz sub-channels;

one 4-MHz sub-channel and two 2-MHz sub-channels; or four 2-MHz sub-channels; and wherein when any sub-channel combination of the frequency band from 779 MHz to 787 MHz of the Internet of Things does not meet a requirement of a terminal on data transmission, dividing a frequency band from 470 MHz to 566 MHz or a frequency band from 614 MHz to 779 MHz of the Internet of Things into a plurality of 1-MHz sub-channels, so as to combine the plurality of 1-MHz sub-channels with the eight 1-MHz sub-channels of the frequency band from 779 MHz to 787 MHz for use.

7. A method, comprising:

sending, by an access point (AP) using a transceiver configured on a sub-channel n, a channel allocation indication message to a terminal $STA_i$ allocated to the sub-channel n, wherein the channel allocation indication message comprises a new modulation and coding scheme and scheduling information that correspond to the $STA_i$ so that the $STA_i$ sends data according to the new modulation and coding scheme, and communicates, according to the scheduling information, with the transceiver on the sub-channel on which the $STA_i$ is located;

wherein the new modulation and coding scheme and the scheduling information are obtained by the access point using the transceiver configuration method for an access point according to claim 1;

wherein n=1 indicates an 8-MHz sub-channel, n=2 and n=3 indicate two 4-MHz sub-channels, n=4, n=5, n=6, and n=7 indicate four 2-MHz sub-channels; and n=8, n=9, . . . , and n=15 indicate eight 1-MHz sub-channels.

8. The method according to claim 7, wherein the scheduling information in the channel allocation indication message comprises: information about a target sub-channel allocated to each $STA_i$, a channel switching time, a corresponding Media Access Control (MAC) address and a corresponding association identifier of the access point after the $STA_i$ switches to the target sub-channel, and a new association identifier of the $STA_i$ after the $STA_i$ switches to the target sub-channel.

9. An access point, wherein a frequency band of the Internet of Things is divided into a plurality of sub-channel combinations comprising a combination of a 1-MHz sub-channel, a 2-MHz sub-channel, a 4-MHz sub-channel, and an 8-MHz sub-channel, and the Internet of Things corresponding to the access point comprises N terminals $STA_i$s, wherein 1≤i≤N and N is a positive integer greater than 1, and the apparatus comprises:

a non-transitory memory; and
a processor, wherein the memory stores executable instructions of the processor, and the processor executes the executable instructions to:
for any $STA_i$ in the Internet of Things corresponding to the access point, obtain a maximum data transfer rate $R_i(n)$ of the $STA_i$ on each sub-channel n in a specified sub-channel combination according to received signal quality information of the $STA_i$; and obtain, according to an average data volume needing to be sent by the $STA_i$ within a beacon period and $R_i(n)$, a channel access time $T_i(n)$ required by the $STA_i$ on the sub-channel n;
determine, according to an available access time $T_{available}(n)$ of each sub-channel n within the beacon period and $T_i(n)$ of the N $STA_i$s, whether the specified sub-channel combination meets an allocation requirement of the N $STA_i$s; and
when it is determined that the specified sub-channel combination meets the allocation requirement of the N $STA_i$s, configure a transceiver on each sub-channel n in the specified sub-channel combination;

wherein n=1 indicates an 8-MHz sub-channel, n=2 and n=3 indicate two 4-MHz sub-channels, n=4, n=5, n=6, and n=7 indicate four 2-MHz sub-channels, and n=8, n=9, . . . , and n=15 indicate eight 1-MHz sub-channels.

10. The access point according to claim 9, wherein the processor further executes the executable instructions to:

determine, according to $T_{available}(n)$ of each sub-channel n and $T_i(n)$ of each $STA_i$, a $STA_i$ to be allocated to each sub-channel n;

when $T_{available}(n)$ of each sub-channel n is used and there is a $STA_i$ that is not allocated to any sub-channel, determine that the specified sub-channel combination does not meet the allocation requirement of the N $STA_i$s; and when there is no $STA_i$ that is not allocated to any sub-channel, and a sum of access time of $STA_i$s on each sub-channel n is not greater than $T_{available}(n)$ of the sub-channel n, determine that the specified sub-channel combination meets the allocation requirement of the N $STA_i$s.

11. The access point according to claim 10, wherein the processor further executes the executable instructions to:

determine, according to a descending order of $R_i(n)$ of the $STA_i$s on a target sub-channel or according to an ascending order of $T_i(n)$ required by the $STA_i$s on the target sub-channel, a $STA_i$ to run on the target sub-channel, and determine, when $T_{available}(n)$ of the target sub-channel within the beacon period is used, all $STA_i$s to be allocated to the target sub-channel; and when there is a $STA_i$ that is not allocated to any sub-channel, determine, according to a specified order, a new target sub-channel, and obtaining $R_i(n)$ of the $STA_i$ that is not allocated to any sub-channel on the target sub-channel until the $STA_i$s are all allocated or $T_{available}(n)$ of all sub-channels in the specified sub-channel combination is used.

12. The access point according to claim 9, wherein the processor further executes the executable instructions to:

when it is determined that the specified sub-channel combination does not meet the allocation requirement of the N $STA_i$s, determine a new specified sub-channel combination according to an ascending order of a quantity of sub-channels, and obtain $R_i(n)$ and $T_i(n)$ of the $STA_i$ on each sub-channel in the new specified sub-channel combination; and when the new specified sub-channel combination meets the allocation requirement of the N $STA_i$s, configure a transceiver for each sub-channel, to which the $STA_i$ is allocated, in the new specified sub-channel combination.

13. The access point according to claim 9, wherein the processor further executes the executable instructions to:

determine, according to a specified order, a target sub-channel from the specified sub-channel combination;

obtain, according to an average data rate $R_{i,QoS}$ comprised in a latest Traffic Specification (TSPEC) element sent by the $STA_i$, the average data volume of the $STA_i$ within the beacon period;

obtain $R_i(n)$ of the $STA_i$ on the target sub-channel according to the received signal quality information of the $STA_i$; and when it is determined that $R_i(n)$ of the $STA_i$ is greater than the average data transfer rate $R_{i,QoS}$ of the $STA_i$, obtain, according to the average data volume of the $STA_i$ within the beacon period and $R_i(n)$, $T_i(n)$ required by the $STA_i$ on the target sub-channel.

14. An access point applied to the Internet of Things, comprising a processor and a transmitter connected to the processor;

wherein the processor is configured to obtain according to received signal quality information of the $STA_i$, a maximum data transfer rate $R_i(n)$ of the $STA_i$ on each sub-channel n in a specified sub-channel combination; and obtain, according to an average data volume needing to be sent by the $STA_i$ within a beacon period and $R_i(n)$, a channel access time $T_i(n)$ required by the $STA_i$ on the sub-channel n; determine according to an available access time $T_{available}(n)$ of each sub-channel n within the beacon period and $T_i(n)$ of the N $STA_i$s, whether the specified sub-channel combination meets an allocation requirement of the N $STA_i$s;

wherein the processor is further configured to, when it is determined that the specified sub-channel combination meets the allocation requirement of the N $STA_i$s, configure a transceiver on each sub-channel n in the specified sub-channel combination, and generate a channel allocation indication message; and wherein the transmitter is configured to send, using a transceiver configured on a sub-channel n, the channel allocation indication message to a terminal $STA_i$ allocated to the sub-channel n, wherein the channel allocation indication message comprises a new modulation and coding scheme and scheduling information that correspond to the $STA_i$, so that the $STA_i$ sends data according to the new modulation and coding scheme, and communicates, according to the scheduling information, with the transceiver on the sub-channel on which the $STA_i$ is located;

wherein a frequency band of the Internet of Things is divided into a plurality of sub-channel combinations comprising a combination of a 1-MHz sub-channel, a 2-MHz sub-channel, a 4-MHz sub-channel, and an 8-MHz sub-channel, and the Internet of Things corresponding to the access point comprises N terminals $STA_i$s, wherein 1≤i≤N and N is a positive integer greater than 1; and wherein n=1 indicates an 8-MHz sub-channel; n=2 and n=3 indicate two 4-MHz sub-channels; n=4, n=5, n=6, and n=7 indicate four 2-MHz sub-channels; n=8, n=9, . . . , and n=15 indicate eight 1-MHz sub-channels.

15. The access point according to claim 14, wherein the scheduling information in the channel allocation indication message comprises:

information about a target sub-channel allocated to each $STA_i$, a channel switching time, a corresponding Media Access Control (MAC) address and a corresponding association identifier of the access point after the $STA_i$ switches to the target sub-channel, and a new association identifier of the $STA_i$ after the $STA_i$ switches to the target sub-channel.

16. The access point according to claim 14, wherein the processor is further configured to:

determine, according to $T_{available}(n)$ of each sub-channel n and $T_i(n)$ of each $STA_i$, a $STA_i$ to be allocated to each sub-channel n;

when $T_{available}(n)$ of each sub-channel n is used and there is a $STA_i$ that is not allocated to any sub-channel, determine that the specified sub-channel combination does not meet the allocation requirement of the N $STA_i$s; and when there is no $STA_i$ that is not allocated to any sub-channel, and a sum of access time of $STA_i$s on each sub-channel n is not greater than $T_{available}(n)$ of the sub-channel n, determine that the specified sub-channel combination meets the allocation requirement of the N $STA_i$s.

17. The access point according to claim 14, wherein the processor is further configured to:

determine, according to a descending order of $R_i(n)$ of the $STA_i$s on a target sub-channel or according to an ascending order of $T_i(n)$ required by the $STA_i$s on the target sub-channel, a $STA_i$ to run on the target sub-channel, and determine, when $T_{available}(n)$ of the target sub-channel within the beacon period is used, all $STA_i$s to be allocated to the target sub-channel; and when there is a $STA_i$ that is not allocated to any sub-channel, determine, according to a specified order, a new target sub-channel, and obtain $R_i(n)$ of the $STA_i$ that is not allocated to any sub-channel on the target sub-channel until the $STA_i$s are all allocated or $T_{available}(n)$ of all sub-channels in the specified sub-channel combination is used.

18. The access point according to claim 14, wherein the processor is configured to:

determine, according to a specified order, a target sub-channel from the specified sub-channel combination;

obtain, according to an average data rate $R_{i,QoS}$ comprised in a latest Traffic Specification (TSPEC) element sent by the $STA_i$, an average data volume of the $STA_i$ within the beacon period;

obtain, according to the received signal quality information of the $STA_i$, $R_i(n)$ of the $STA_i$ on the target sub-channel; and when the access point determines that $R_i(n)$ of the $STA_i$ is greater than the average data transfer rate $R_{i,QoS}$ of the $STA_i$, obtain, according to the average data volume of the $STA_i$ within the beacon period and $R_i(n)$, $T_i(n)$ required by the $STA_i$ on the targetsub-channel.

* * * * *